March 12, 1968

Y. M. HOAG 3,372,938

TAPE RECORDER HEAD-PAD MECHANISM

Filed July 15, 1965

INVENTOR:
YATES M. HOAG,

BY Norman C. Fulmer
HIS ATTORNEY.

United States Patent Office 3,372,938
Patented Mar. 12, 1968

3,372,938
TAPE RECORDER HEAD-PAD MECHANISM
Yates M. Hoag, Utica, N.Y., assignor to General Electric Company, a corporation of New York
Filed July 15, 1965, Ser. No. 472,147
7 Claims. (Cl. 274—11)

ABSTRACT OF THE DISCLOSURE

A tape recorder head pad mechanism including a head pad carried by a lever arm pivotally attached to a movable member, a fixed member engaging the lever arm when the movable member is moved away from the head to thereby swing the head pad away from the head.

This invention relates to tape recorders, and particularly to head-pad mechanisms for holding tape against the heads of a tape recorder.

Tape recorders generally perform the functions of recording, playback, and rewind; a "stop" condition also is provided. During the recording and playback functions, the tape (magnetic tape, for example), is drawn past suitable "erase," recording, and/or playback magnetic heads, and it is desirable to employ means such as one or more head pads to urge the moving tape against the magnetic heads with a suitable pressure so as to insure proper recording and playback performance. During the "stop" and "rewind" functions, the head pads must be removed or spaced away from the magnetic heads. Various mechanisms, of varying degrees of complexity and effectiveness, have been devised to move the head pads toward and away from the magnetic heads in the required manner. When in the "stop" condition it is desirable that the head pads be spaced far enough from the magnetic heads to permit tape to be easily inserted into or removed from this space. If the head pads are not sufficiently far away from the magnetic heads in the "stop" condition, not only is it more difficult to manipulate the tape in this space when inserting or removing it, but also there is danger of one's fingers catching on the delicate head pads and tearing them or bending their supporting mechanism.

An object of this invention is to provide an improved head pad mechanism for tape recorders.

Another object is to provide a simple and inexpensive head pad mechanism which not only provides proper head pad pressure against the tape, but which also causes the head pads to move a suitable distance away from the head to permit easy insertion and removal of the tape and also to protect the head pads from damage by careless fingers.

Further objects will be apparent from the following description and claims, and from the accompanying drawing.

The head pad mechanism of the invention comprises, briefly and in a preferred embodiment, a head pad arrangement carried by a lever arm, this lever arm being pivotally attached to a movable member adapted to be moved toward and away from the heads. A relatively fixed member is arranged to be contacted by the lever arm when the head pads are being moved away from the heads, so as to cause the lever arm and head pads to swing farther away from the heads than would otherwise be the case. A spring is arranged between the lever arm and the movable member, to resiliently urge the head pads toward the heads for holding tape against the heads with a desired pressure. Preferably, in accordance with the invention, the lever arm is pivotally attached to a pinch-wheel arm so that whenever the pinch wheel is moved away from the capstan, the head pads also will be moved away from the heads.

Figure 1:
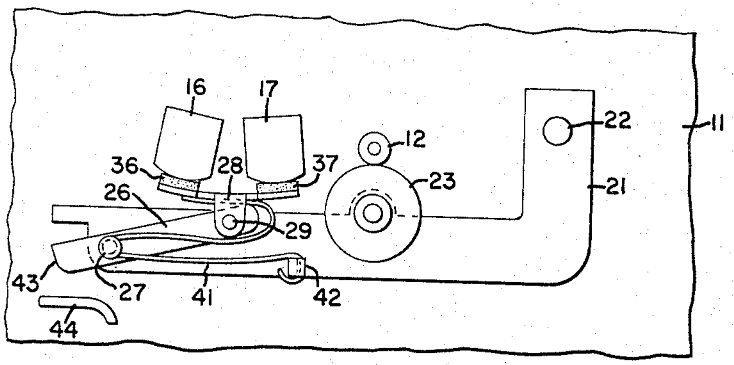
Figure 2:
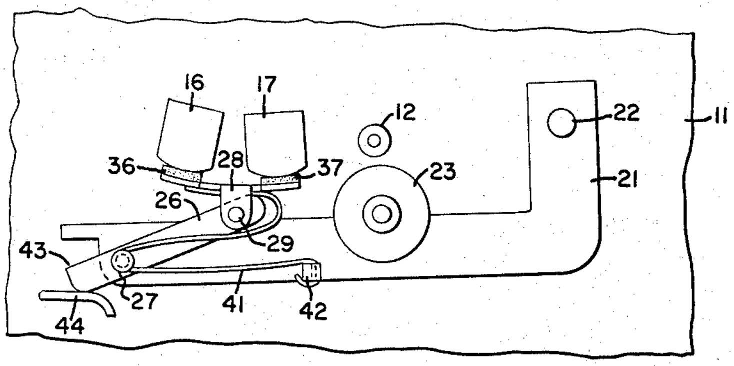
Figure 3:
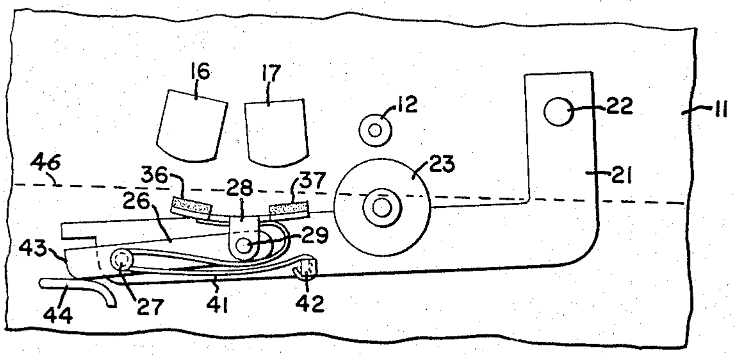
Figure 4:
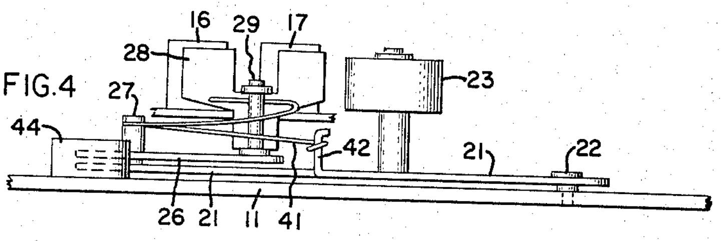

In the drawings, FIG. 1 is a top view of a preferred embodiment of the invention, with the mechanism in the condition for recording and also for playback, FIG. 2 is a similar view to that of FIG. 1, in which the pinch wheel and head pad mechanism has been moved partially into its "stop" position, FIG. 3 is a view similar to that of FIGS. 1 and 2, in which the pinch wheel and head pad mechanism is in the "stop" condition (and also in the "rewind" condition), and FIG. 4 is a front view of the mechanism in the condition of FIG. 3.

The mechanism of the preferred embodiment shown in the drawing comprises a housing or base plate 11 which carries the tape recorder mechanism. A capstan shaft 12 extends upwardly from the base plate 11 and is adapted to be rotated by a motor or other suitable means so as to drive a magnetic or other type of tape (not shown) past one or more magnetic or other types of heads 16 and 17. In a typical tape recorder, there will be an "erase" head 16 and a record/playback head 17.

A pinch-wheel arm 21 is pivotally mounted at 22 to the base plate 11, and carries a pinch wheel 23 rotatably mounted thereon. When in the position shown in FIG. 1, the pinch wheel 23 is urged toward the capstan 12 so as to pinch the magnetic tape between the capstan 12 and pinch wheel 23, to insure that the rotating capstan 12 will drive the tape past the magnetic heads 16 and 17. Normally a tape supply reel (not shown) is positioned at the left of the heads 16 and 17, and a takeup reel (not shown) is provided at the right of the capstan 12, in well-known manner. Suitable means, such as a lever or a cam, normally are employed for causing the arm 21 to swing the pinch wheel 23 away from the capstan 12 when the mechanism is in the "stop" or "rewind" condition.

In accordance with the invention, a head pad lever arm 26 is pivotally attached at 27 to the pinch-wheel arm 21. A head pad holder plate 28 is pivotally attached at 29 to the lever arm 26, and carries head pads 36 and 37 of resilient material such as felt and positioned in alignment with the magnetic gaps of the heads 16 and 17, so that when the mechanism is in the position shown in FIG. 1 the head pads 36 and 37 will resiliently urge the magnetic tape against the magnetic heads 16 and 17 by means of spring pressure. Further in accordance with the invention, the head pad pressure is achieved by means of a bent-wire spring 41 which is shaped to loop around a post 42 carried by the pinch-wheel arm 21 so as to anchor one end of the spring 41 to the pinch-wheel arm 21. As shown in the drawing, the spring 41 loops once or twice around the pivot post 27 at which the lever arm 26 is pivotally attached to the pinch-wheel arm 21, and thence the spring 41 is shaped to curve around the right side of the head pad holder plate pivot 29 and then bends to the left where it terminates in contact against the rear surface of the head pad plate 28. The special spring 41, constructed as shown, exerts a force from the pinch-wheel arm 21 to the head-pad plate 28, thus urging the head pads 36 and 37 against the magnetic heads 16 and 17 with a desired amount of pressure so as to insure that the magnetic tape will be held closely against the magnetic heads 16 and 17. Due to the head pad plate 28 being pivoted as shown at 29, with the spring 41 bearing there-against at both sides from the pivot 29, the pressure of spring 41 will be automatically equally distributed between the pads 36 and 37, so these two pads will be urged with equal resilient pressures toward the magnetic heads 16 and 17.

The head-pad lever arm 26 extends to the left from its supporting pivot 27, in a direction away from the head pad plate 28, and terminates preferably with a rounded shoulder as indicated by the numeral 43. Also, as shown, the end 43 of the lever arm 26 extends to the left beyond the end of the pinch-wheel arm 21.

A fixed member 44 extends upwardly from the base plate 11 at a position so as to be engaged by the end 43 of lever arm 26 when the pinch-wheel arm 21 is swung partly away from the capstan 12 and the magnetic heads 16 and 17, as shown in FIG. 2. Upon continued swinging of the pinch-wheel arm 21 away from the capstan 12 and the magnetic heads 16 and 17, the fixed member 44 causes the lever arm 26 to pivot with respect to the pinch-wheel arm 21, thus moving the head pads 36 and 37 faster and farther away from the magnetic heads 16 and 17 than would otherwise occur, due to the mechanical advantage achieved by the arrangement. FIG. 3 shows the mechanism in the "stop" condition, this condition being the same as for the "rewind" function of the tape recorder. The mechanical advantage achieved by the mechanism of the invention can readily be realized by comparing FIGS. 2 and 3. Although the pinch-wheel 23 has moved only a little further away from the capstan 12 in FIG. 3 than in FIG. 2, the head pads 36 and 37 have moved a considerable distance in the position of FIG. 3 as compared with FIG. 2.

The arrangement of the head pad tension spring 41, in accordance with the invention, maintains the head pads 36 and 37 relatively equidistant from the magnetic heads 16 and 17, due to the forward end of the spring 41 lying against the back of the head pad plate 28 at both sides from the pivot 29. Thus, the spring 41 not only applies substantially equal head-pad pressure towards the recording heads 16 and 17 when in recording or playback condition as shown in FIG. 1, but it also maintains maximum and equal spacing between the head pads 36 and 37 and their respective heads 16 and 17 when the tape recorder mechanism is in the "stop" or "rewind" condition as shown in FIG. 3. The curved shoulder at the end 43 of the lever arm 26 insures a smooth functioning of the mechanism, even through there is a slight sliding of the end 43 against the fixed member 44 when the mechanism is moving.

Preferably, the tape recorder housing is provided with a portion thereof which extends above and over the entire head pad mechanism when in the "stop" condition as shown in FIG. 3. This portion of the housing, the edge of which is indicated by the dotted line 46 in FIG. 3, conceals and protects the spring 41 and lever arm 26 at all times, and also conceals and protects the head pads 36 and 37 and their mounting plate 28 when in the "stop" position of FIG. 3.

It is important and advantageous that the head pads move relatively far away from the heads, and under the protective lip portion 46, as provided by the mechanism of the invention, because when one is inserting tape in the space between the heads 16–17 and the head pads 36–37, and the capstan 12 and pinch-wheel 23, the head pads and associated mechanism are more completely protected from careless fingers which might otherwise tend to scrape the head pads or perhaps bend the head pad plate 28 or other parts of the mechanism.

While a preferred embodiment of the invention has been shown and described, various other embodiments and modifications thereof will be apparent to those skilled in the art, and will fall within the scope of invention as defined in the following claims.

What I claim is:

1. A head pad mechanism for a tape recorder having at least one head, comprising a base a movable member attached to said base adapted to be moved toward and away from said head, a lever arm pivotally attached to said movable member so as to be swingable toward and away from said head, a head pad carried by said lever arm and adapted to be aligned over said head when said lever arm is swung toward the head, and a member fixed and positioned on said base so as to be contacted by said lever arm, when said movable member is moved away from said head whereby the lever arm is caused to swing said head pad away from said head.

2. A mechanism as claimed in claim 1, including a head-pad plate pivotally mounted on said lever arm, said head pad being attached to said head-pad plate on the front side thereof facing said head, and further including an elongated spring member attached to said movable member and extending across and in engagement with at least a portion of the back of said head-pad plate to urge said head-pad plate toward said head and also to maintain the head-pad plate in alignment with said head.

3. A head pad mechanism for a tape recorder having a base and at least one head and a capstan, a pinch wheel, a pivoted pinch-wheel arm on said base carrying said pinch wheel and adapted to swing the pinch wheel toward and away from said capstan, said head pad mechanism comprising a lever arm pivotally attached to said pinch-wheel arm so as to be swingable toward and away from said head, a head pad carried by said lever arm and adapted to be aligned over said head when the lever arm is swung toward the head, resilient means resiliently urging said lever arm to swing in the direction of said head, said lever arm being provided with a portion extending in the reverse direction from its pivot point, and a member fixed and positioned on said base so as to be contacted by said extending portion when said pinch-wheel arm is swung away from said capstan, whereby the lever arm is caused to swing said head pad away from said head.

4. A mechanism as claimed in claim 3, including a housing member extending generally over said mechanism toward said head and terminating a fixed distance away from said head, and in which said lever arm is arranged to provide a mechanical motion advantage sufficient to cause said head pad to be swung by said lever arm to a protective position beneath said housing member when said pinch-wheel arm is swung to its position away from the capstan.

5. A mechanism as claimed in claim 3, including a head-pad plate pivotally mounted on said lever arm, said head pad being attached to said head-pad plate on the front side thereof facing said head, and in which said resilient means comprises an elongated spring member having a portion thereof fixed with respect to said pinch-wheel arm and extending across and in engagement with at least a portion of the back of said head-pad plate to urge said head-pad plate toward said head and also to maintain the head-pad plate in alignment with said head.

6. A mechanism as claimed in claim 5, in which said spring member is attached to said pinch-wheel arm, extends around said pivotal attachment of the lever arm to the pinch-wheel arm, and then extends into said engagement with the head-pad plate.

7. A mechanism as claimed in claim 5, including at least a second head positioned beside the first head, a second head pad attached to said head-pad plate and in alignment with said second head, said pivotal mounting of the head-pad plate to the lever arm being between said pads, and said engagement of the spring member with the back of the head-pad plate extending on both sides thereof from said pivotal mounting of the head-pad plate, thereby maintaining both head pads in alignment with the respective heads.

References Cited

UNITED STATES PATENTS

| | | | |
|---|---|---|---|
| 2,595,197 | 4/1952 | Kuhlow | 274—4 X |
| 2,682,410 | 6/1954 | Bauman | 274—4 |
| 2,793,039 | 5/1957 | Hironimus | 274—4 |
| 2,957,049 | 10/1960 | Uritis | 274—4 X |
| 3,197,210 | 7/1965 | Astumi | 274—4 X |

WILLIAM D. MARTIN, Jr., *Primary Examiner.*